United States Patent
Himmelstein

(10) Patent No.: US 6,496,107 B1
(45) Date of Patent: Dec. 17, 2002

(54) VOICE-CONTROLLED VEHICLE CONTROL SYSTEM

(76) Inventor: Richard B. Himmelstein, 7 Braden Dr., Palermo, NJ (US) 08223

( * ) Notice: Subject to any disclaimer, the term of this patent is extended or adjusted under 35 U.S.C. 154(b) by 0 days.

(21) Appl. No.: 09/624,300

(22) Filed: Jul. 24, 2000

Related U.S. Application Data

(60) Provisional application No. 60/145,378, filed on Jul. 23, 1999, and provisional application No. 60/147,057, filed on Aug. 3, 1999.

(51) Int. Cl.[7] .............................................. B60R 25/10
(52) U.S. Cl. ..................... 340/426; 340/5.2; 340/5.61; 340/5.72; 340/5.8; 340/5.84; 340/5.74; 713/202; 380/26; 380/266
(58) Field of Search ............... 340/426, 5.61, 340/5.52, 5.8, 5.74, 5.84, 541, 5.2, 5.72, 436, 903; 380/266, 25; 713/202; 381/86; 455/403, 419, 151.2, 151.4

(56) References Cited

U.S. PATENT DOCUMENTS

| | | | |
|---|---|---|---|
| 4,506,378 A | | 3/1985 | Noso et al. ................ 704/275 |
| 4,593,403 A | | 6/1986 | Kishi et al. ................ 704/243 |
| 4,856,072 A | * | 8/1989 | Schneider et al. ............ 381/86 |
| 5,153,918 A | * | 10/1992 | Tuai ............................ 380/25 |
| 5,226,256 A | | 7/1993 | Fries et al. .................... 49/13 |
| 5,335,276 A | | 8/1994 | Thompson et al. ......... 380/266 |
| 5,450,525 A | | 9/1995 | Russell et al. ............. 704/275 |
| 5,465,401 A | | 11/1995 | Thompson ................... 455/558 |
| 5,509,852 A | | 4/1996 | Clark ............................ 454/75 |
| 5,650,774 A | * | 7/1997 | Drori ........................ 340/5.22 |
| 5,675,633 A | | 10/1997 | Kopp et al. ............... 379/88.07 |
| 5,767,795 A | | 6/1998 | Schaphorst .................. 340/988 |
| 5,801,616 A | | 9/1998 | Ghazarian et al. .......... 340/426 |
| 5,812,067 A | * | 9/1998 | Bergholz et al. ........... 340/5.52 |
| 5,864,603 A | | 1/1999 | Haavisto et al. ......... 379/88.01 |
| 5,960,085 A | * | 9/1999 | De La Huerga .............. 380/25 |
| 6,073,840 A | * | 6/2000 | Marion ....................... 235/381 |
| 6,161,005 A | * | 12/2000 | Pinzon ........................ 340/5.2 |
| 6,189,105 B1 | * | 2/2001 | Lopes ......................... 713/202 |

* cited by examiner

*Primary Examiner*—Benjamin C. Lee
(74) *Attorney, Agent, or Firm*—Volpe and Koenig, P.C.

(57) ABSTRACT

A vehicle control system for permitting voice control of at least one device in a vehicle by at least one user includes a radio transponder unit which outputs an RF signal which includes an identification code; an electronic receiver for receiving the RF signal and down converting the received signal to output the identification code; a microphone for receiving an audible signal spoken by a user and converting the audible signal to a digital signal; a memory for storing a plurality of files, each file comprising a voiceprint of a user and a command instruction for controlling at least one function of the device; and a microprocessor for determining whether the identification code is valid and for analyzing the digital signal to determine whether it matches one of the voiceprints stored in memory if the identification code is determined valid. The microprocessor executes a command instruction to control the function of the device if a match has been found.

12 Claims, 4 Drawing Sheets

VOICE-CONTROLLED VEHICLE CONTROL SYSTEM

This application claims benefit of U.S. provisional application No. 60/145,378 filed Jul. 23, 1999 and No. 60/147,057 filed Aug. 3, 1999.

BACKGROUND

The present invention relates to security systems. In particular, the invention relates to a security device or system which incorporates both voice-control and proximity detection to provide enhanced security.

Voice recognition has been, and continues to be, developed to provide control of electronic systems using spoken commands. Spoken commands may not only facilitate easier use of a system, but also enhance the security aspects of a system. For instance, the voice pattern of the user may be part of the security system which authenticates a user's authorization for access. U.S. Pat. No. 4,856,072 discloses a vehicle security system which can be voice actuated by any authorized person. In this manner, voice activated control systems are known which control various functions within an automobile.

Electronic identification devices which incorporate radio transponders are also known in the art. Transponders are generally categorized as either active or passive, based upon the power source used to power the transponder. Active transponders periodically transmit encoded data on a selected frequency to a remote receiver located on the item to which access is desired. For example, U.S. Pat. No. 3,772,668 discloses a freight security system comprising a base station and active transponders, each of which include a self-contained power supply.

In contrast, for passive transponders, the RF carrier signal received from an interrogating unit is the source of operating power. Accordingly, passive transponders are not activated until they come within the vicinity of the interrogating unit. U.S. Pat. No. 5,153,583 discloses a portable passive transponder having a single inductive coil for simultaneous reception and transmission of signals to and from an interrogating unit.

The security system according to the present invention increases security while eliminating the need for a key and/or a multiplicity of control buttons.

SUMMARY

The present invention is a security device or system which permits enhanced security and control using a voice signal in combination with a transponder unit. A user who desires the ability to control an object, such as an automobile, or to access and control an area, such as a building, carries a small portable radio transponder unit. The transponder unit is preferably incorporated into a plastic card, such as a credit card, but can also be incorporated in a wristband, watch, wallet or piece of jewelry. When the transponder comes within a predetermined range of a base unit located on the object to be controlled, the transponder transmits an RF signal including an identification code and interfaces with a base unit. The base unit receives the RF signal and verifies if that particular identification code is valid. If the identification code is valid, the base unit instructs the security device or system to await a vocal command.

Upon receiving a voice command, the security device or system authenticates the voice command by matching it with a voiceprint template that is previously stored. If there is a match, the device or system performs the function that was requested. For example, an authorized user may direct an automobile security system to perform various functions such as "unlock and open driver door" or "unlock and open all doors." If both the transponder signal and voice command are approved, the system will perform the function accordingly. The present invention increases security by ensuring that the transponder and voice command are authentic and are within a predefined distance from each other and the base unit.

BRIEF DESCRIPTION OF THE DRAWING(S)

DETAILED DESCRIPTION OF THE PREFERRED EMBODIMENT(S)

Figure 1:
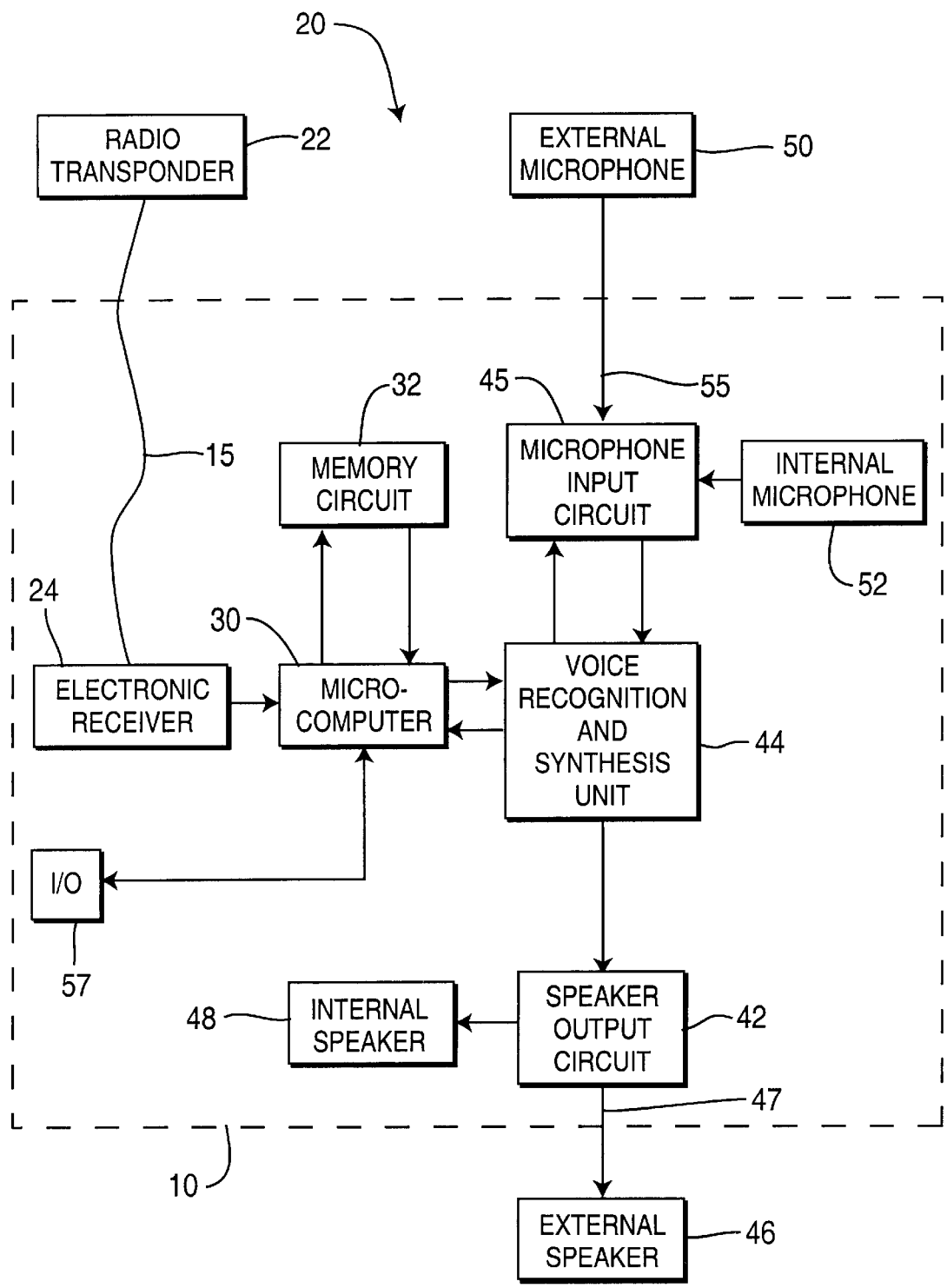
FIG. 1 is a block diagram of a security system according to the present invention.

The present invention will be described with reference to the drawing Figures where like numerals represent like elements throughout.

To facilitate understanding of the present invention, the invention will be described with reference to an automobile security system 20. However, those of skill in the art realize that the teachings of the present invention are equally applicable to a security system for a building such as a residence, commercial establishment or professional office building. The present invention is also adaptable to be installed as a security device on an individual door, window, any type of machinery; any type of computer or electronic equipment; any type of recreational equipment, or even individual pad or combination locks.

A block diagram of an automobile security system 20 embodying the present invention is shown in FIG. 1. A dashed line 10 graphically represents a vehicle, in which all of the components located within the area defined by the dashed line 10 are typically internal to the vehicle. The system 20 includes a portable radio transponder 22, an electronic receiver 24, a microcomputer 30 including an accessible memory circuit 32, a voice-recognition and synthesis unit 44, a microphone input circuit 45, external and internal microphones 50, 52, a speaker output circuit 42 and external and internal speakers 46, 48. The transponder 22 continually transmits an identification signal 15 which is unique to that user or that particular transponder 22.

As aforementioned, there are two types of transponders: 1) active transponders; and 2) passive transponders. Active transponders include a power source such as a battery and a transmitter, and periodically transmit an identification signal. A passive transponder is inactive until it comes within a predetermined range of an activation unit. The passive transponder is activated when it receives an RF signal from an activating unit; whereupon the transponder is energized and begins to transmit an identification signal. Although the present invention is being described with reference to an active transponder, it is equally applicable to the use of a passive transponder.

When a user carrying the active transponder 22, (which continually transmits an RF signal including an identification code 15), comes within a predetermined range of the receiver 24 which is mounted on the vehicle 10, the receiver 24 receives the RF signal 15. The receiver 24 then feeds the identification code to the microcomputer 30 which processes the identification code to determine whether the identification code matches the identification data previously stored in the memory circuit 32.

Once a positive identification has been made, the microcomputer 30 generates a control signal to activate the voice recognition and synthesis unit 44. The voice recognition and synthesis unit 44, which is connected to a microphone input circuit 45 and a speaker output circuit 42, sends a signal to the microphone input circuit 45 to begin detecting all audible signals within the range of the microphone 50.

Voice commands are recognized by either an external or internal microphone 50, 52 and are input signals 55 to the microphone input circuit 45. The microphone input circuit 45 converts the input signals 55 to digital format. The voice recognition and synthesis unit 44 then receives the digital input signal from the microphone input circuit 45 and sends it to the microcomputer 30, which analyzes the digital input signal.

The microcomputer 30 has an associated memory (not shown) which includes a plurality of "templates" for each potential spoken command as spoken by the user. Each spoken command will have at least one action for the system to initiate. For example, the template for the command "unlock driver's door" includes an entry in memory which comprises a recording of the user's voice speaking the command "unlock driver's door", which was digitized, processed and stored in memory. As those skilled in the art should realize, there are many different signal processing techniques which may be utilized to process and store a voice signal. These voice recognition and processing techniques are being increasingly used for word processing (such as Dragon Naturally Speaking and Via Voice typing software), VCR programming and in many other types of consumer applications. It is intended that the present invention be utilized in conjunction with any current or future type of voice recognition. Accordingly, a voiceprint template in digital format for the words "unlock driver's door" as spoken by the user is stored in memory.

The system 20 permits errors in the commands within a predetermined tolerance. The system 20 is configurable to tailor the spoken commands particularly to a single user's voice, may be programmed for several or many users, or may include a large error tolerance such that it is generalized to any person's spoken commands. If a particular command is not tailored to a specific user's voice, the received voice command voiceprint template stored in memory will permit a greater degree of error than with the templates which are customized to a particular user's voice.

TABLE 1

| | | 1<br>VOICE<br>COMMAND | 2<br>SECURITY<br>LEVEL | 3<br>USER | 4<br>VOICEPRINT<br>TEMPLATE | 5<br>ENABLED | 6<br>ACTION | 7<br>HIERARCHY |
|---|---|---|---|---|---|---|---|---|
| ROW | 1 | Unlock<br>Driver's Door | 1 | Richard<br>Victoria | 01101111...<br>01110110... | Yes<br>Yes | Unlock Door<br>Unlock Door | 1<br>2 |
| | 2 | Turn On<br>Stereo | 2 | Richard | 10101110... | Yes | Turn On 1060 AM<br>Volume Setting 2 | 1 |
| | | | | Victoria | 11011011... | Yes | Turn On 100.3 FM<br>Max Volume | 2 |
| | 3 | Turn Off<br>Stereo | 10 | Richard<br>Victoria | 11101110...<br>01101110... | Yes<br>Yes | Turn Off<br>Turn Off | 1<br>2 |
| | 4 | Turn On<br>Wipers Low | 10 | Richard<br>Victoria | 11111000...<br>10101010... | Yes<br>No | Turn On Setting 3<br>XXXX | 1<br>X |
| | 5 | Turn On<br>Wipers High | 10 | Richard<br>Victoria | 10111110...<br>10100001... | Yes<br>No | Turn On Setting 9<br>XXXX | 1<br>X |
| | 6 | Sunny Day | 5 | Richard | 10111011... | Yes | 1) Open All Windows<br>2) Open Sunroof<br>3) Turn On Stereo To<br>100.3 FM Max<br>Volume<br>4) Turn On Fan High | 1 |

Table 1 shows the voiceprint templates as stored in memory. As shown, each voice command is associated with at least six additional fields of information as shown by column 2–7 in Table 1: security level, user, voiceprint template, enabled, action, hierarchy. For example, if the voice command is "unlock driver's door", as shown in column 1, row 1 there are two associated voiceprint templates as shown in column 4, row 1. The first template is associated with the user Richard, and the second template is associated with the user Victoria. In this example, Richard and Victoria can each create their own voiceprint timeplate by speaking the command "unlock driver's door" into the internal or external microphones 50, 52. This information is processed as described hereinbefore and stored in memory as a voiceprint template.

The user may also customize the particular action associated with the voice command. As shown in column 6, row 1, the only action associated with "unlock driver's door" is to unlock the door. In a second example, however, for the voice command "turn on stereo" the user Richard has customized the action associated with turning on the stereo to the following: turn on 1060 am, volume setting 2. In contrast, the user Victoria has customized the action associated with her voiceprint template for turn on stereo to: turn on 100.3 fm, max volume. In this manner, each voice command is customized in accordance with the user's specific requirements.

There may be situations where different users' commands may conflict. In the aforementioned example regarding turning on the stereo, the actions associated with the voice command "turn on stereo" as shown in column 6 conflict regarding both the station selection and the volume setting. In this case, the hierarchy field shown in column 7 gives priority to the user Richard. The user Victoria has second priority. If additional users were specified, they can in turn have their own priority under the hierarchy.

The security level column, shown as column 2, permits the system 20 to accept varying thresholds for voiceprint template identification. This enables certain voice commands to have a higher level of security than other commands. For example, the voice command "unlock driver's door" has a security level of 1, indicating that it is a highly secure function. For a higher security level, the threshold for voiceprint template identification will be extremely high; i.e., the voiceprint template must be highly correlated with the received voice command. However, other voice commands may have lower security levels. For some commands such as "turn on wipers low" or "turn on wipers high", a security level of 10 permits an almost "generic" user to perform the command. This is a particularly useful feature, such as when valet personnel require access to certain functions and have not previously entered a voiceprint template into the system 20. It should be noted that, as shown in row 5 for the voice command "turn on wipers high", although a "generic" user may operate the wipers, the system 20 may detect the voiceprint template for Victoria and refuse to grant access to that command since the enabling feature shown in column 5 is "no". This will "lock out" the user Victoria and keep the user Victoria from performing that particular command. A user with a higher hierarchy can modify, override or disable any commands executed by a user with a lower hierarchy.

In the same manner, the system 20 may be utilized to create certain "mood" voice commands. For example, as shown in row 6, the user Richard may create a "sunny day" voice command with a plurality of associated actions to be undertaken by the system 20, such as:

1) open all windows;
2) open sun roof;
3) turn on stereo to 100.3 fm, max volume; and
4) turn on fan high.

In this matter, the system 20 may be customizable for any type of mood, weather or driving condition, and may also be tailored to plurality of individual users in a predetermined hierarchical basis.

Figure 3:
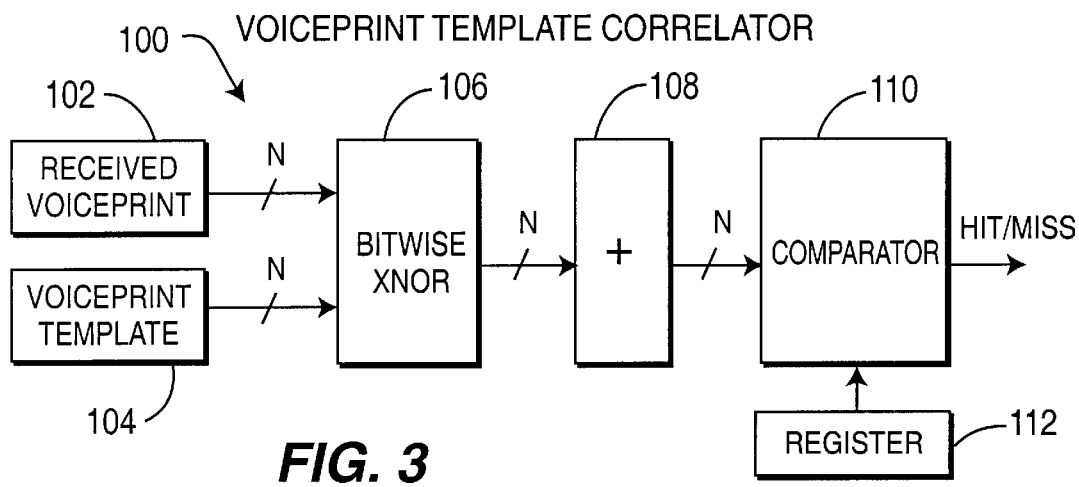
FIG. 3 is a block diagram of the correlator.

Referring to FIG. 3, the voiceprint template correlator 100 is shown. The correlator 100 is executed via the microcomputer 30 and the associated memory 32, (shown in FIG. 1), and includes a bitwise XNOR 106, an adder 108 a comparator 110 and a register 112. The voiceprint template 104 is compared to the received voiceprint 102 in a bitwise XNOR 106. The bitwise XNOR 106 compares a received voiceprint 102 to the voiceprint template 104 on a bit-by-bit basis. Each bit match is output as a logical one, and each bit mismatch is output as a logical zero. The adder 108 adds up all of the matching bits and the comparator 110 compares the total number of matching bits to a threshold stored in the register 112. If the total number of matching bits exceeds the threshold as output by the register 112, a "hit" is registered and the received voiceprint 102 is considered to be the same as the voiceprint template 104. If the total number of matching bits is less than the threshold, a "miss" is output and the received voiceprint 102 is considered not to be the same as the voiceprint template 104. As aforementioned, the threshold set in register 112 is variable depending upon the security level shown column 2 of Table 1. Although a specific correlator 100 is shown in FIG. 3, it should be recognized that there are many types of correlators and comparators that perform the same type of function which are known to those skilled in the art. The correlator 100 as shown in FIG. 3 is intended to be illustrative and not exclusive.

All received voice commands are analyzed to determine whether they correspond to one of the voiceprint templates stored in memory. If there is no match, the system 20 will prompt the user to reinput the voice command by re-speaking the command. Once a predetermined number of attempts has been permitted, the system 20 will enter a "safe mode" and will refuse to accept any more voice commands for a predetermined period of time, which may be set by an authorized user upon initial system setup.

If the voice command corresponds to a selected one of the voiceprint templates stored in the memory circuit 32, the microcomputer 30 generates a control signal to the voice recognition and synthesis unit 44. The voice recognition and synthesis unit 44 provides a digital output signal to the speaker output circuit 42, which converts the digital output signal to an audible output signal and supplies the output instruction signal 47 to the external or internal speakers 46, 48. These speakers 46, 48 generate alarm signals as well as audible announcements to inform the user of the present operating status of the automobile security system 20. Additionally, the microcomputer 30 implements the actions associated with the particular voiceprint template via the input/out (I/O) interface 57. The I/O 57 interfaces with many of the vehicles electrical and electromechanical systems to implement the associated actions. In such a manner, the system 20 may confirm that the instruction contained within the voice command is being carried out, or whether additional security information or clarification is necessary.

Voice commands can be used in this manner to control the functions of the vehicle. The functions include turning the ignition switch on/off, locking/unlocking doors, opening/closing (i.e. power) doors and windows, controlling turn signals, hazard lights, head lights, parking lights, interior lights, horn, radio (on, off, scan, set and other specific settings), defroster, temperature controls, wipers (including variable speeds), mirrors and all other basic functions of a vehicle. The system also permits voice activation or deactivation of the alarm system.

The transponder 22 and receiver 24 are also capable of using various platforms including, but not limited to, Bluetooth technology. A security system equipped with a Bluetooth radio establishes instant connection to another Bluetooth radio as soon as it comes into range. Since the Bluetooth technology supports both point-to-point and point-to-multipoint connections, several piconets can be established and linked together ad hoc. Bluetooth topology is best described as a multiple piconet structure. Using a technology such as Bluetooth allows transponders 22 and receivers 24 to communicate through other transponders 22 and receivers 24 (i.e. repeaters).

Optionally, the system 20 may allow the processing of the transponder signal 15 and voice command simultaneously. When both the transponder signal 15 and voice command are approved, the system 20 will perform the function being requested.

It is to be emphasized that the vehicle security application depicted in FIG. 1 is only exemplary of one of the many and varied applications with which the present invention may be used. For instance, the present invention can permit a user in a work environment to have access through locked doors, cabinets or computers, etc. Another use of this system 20 can be for hotels, whereby a guest can be given a plastic card having a transponder 22. The voice of the guest can be programmed at the front desk, upon registration such that the guest can open the door to selective hotel rooms. Further, various functions inside the hotel room may also be voice-controlled. This security system of the present invention can also secure electronic and other equipment, if a user's voice and identification data contained in the transponder unit have been pre-programed. For instance, in order to use phones, computers other electronic devices, or have access to various web sites, the transponder 22 can include a memory and these devices can be programed into the transponder 22 along with the user's voice. This permits one to use the particular electronic device or surf the web using their voice, and the transponder 22 can control the access.

Figure 2:
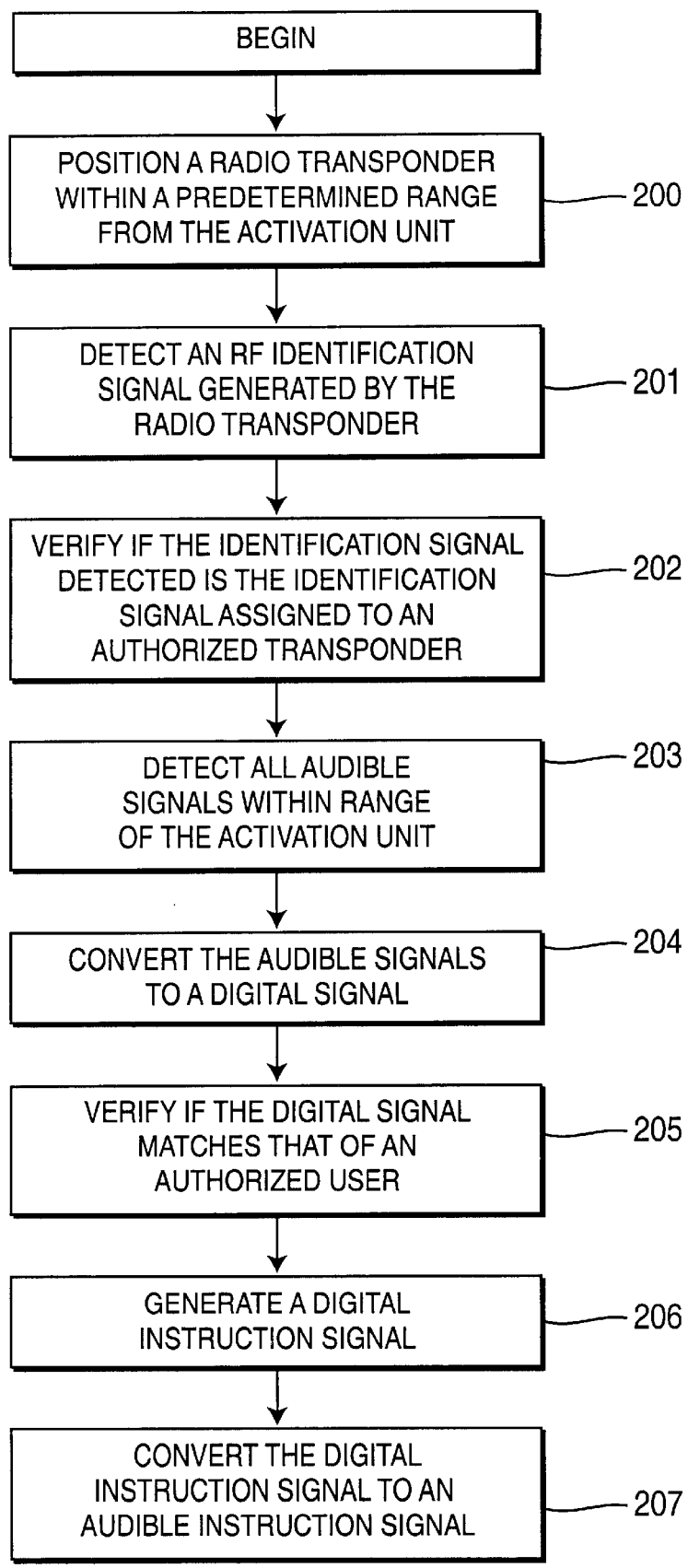
FIG. 2 is a flow diagram which illustrates the method of the present invention.

Referring to FIG. 2, a method of voice-controlling a security system with a proximity detector is described in accordance with the present invention. The method includes the steps of: positioning a radio transponder within a pre-determined range from the activation unit (step 200); detecting an RF signal generated by the radio transponder including the identification code (step 201); verifying if the identification code detected is the identification code assigned to an authorized transponder (step 202); detecting all audible signals within range of the activation unit (step 203); converting the audible signal to a digital signal (step 204); verifying if the digital signal matches that of an authorized user (step 205); generating a digital instruction signal (step 206); and converting the digital instruction signal to an audible instruction signal (step 207).

Figure 4:
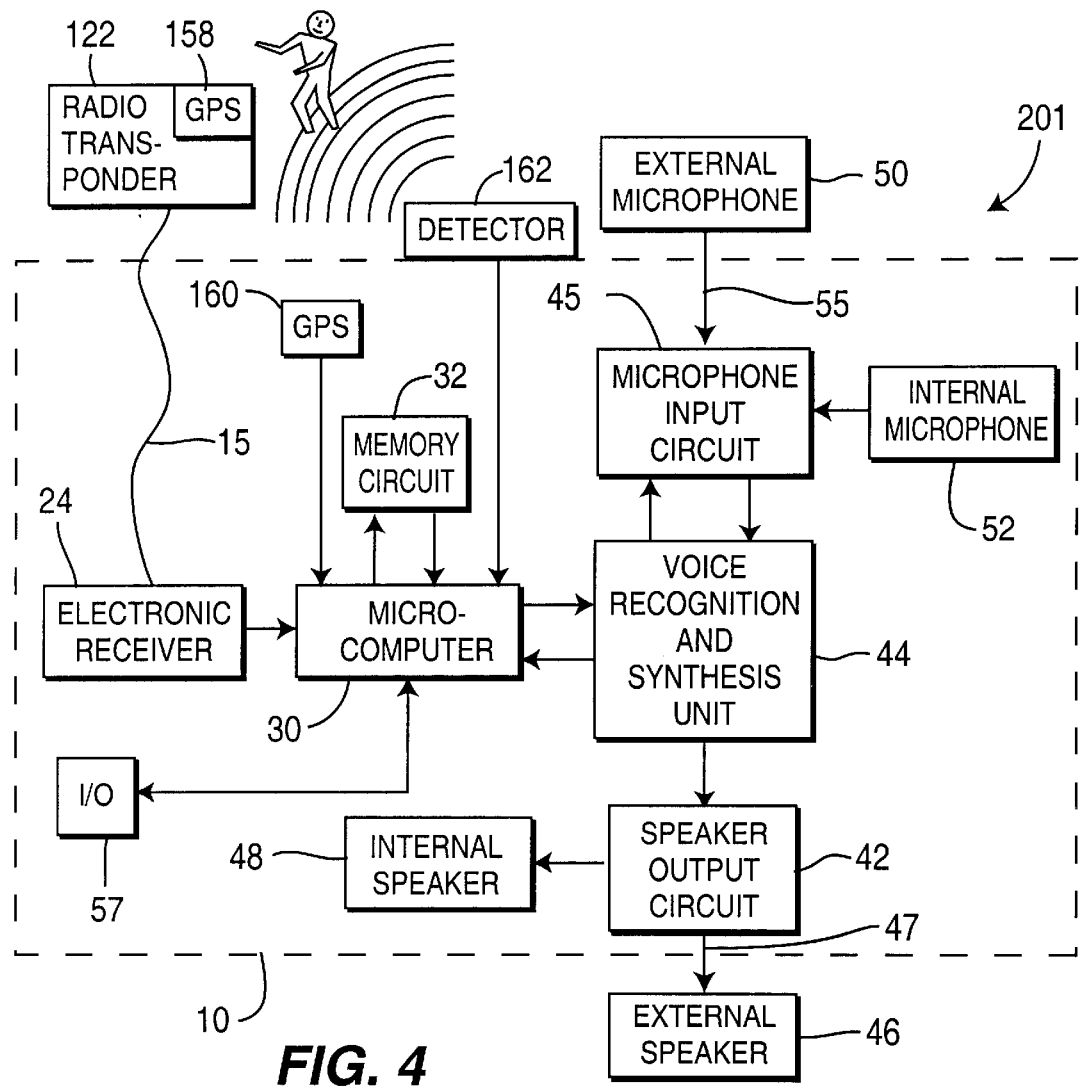
FIG. 4 is an alternative embodiment of the present invention utilizing the GPS.

An alternative embodiment 201 of the present invention is shown in FIG. 4. This embodiment is similar to the embodiment shown in FIG. 1, except that the radio transponder 22 includes a GPS locator 158 and the vehicle includes a GPS receiver 160 and a detector 162, which have outputs fed to the microcomputer 30. In this embodiment, the transponder 122 also sends a location signal to the receiver 24 as output by the GPS receiver 158. The microcomputer 30 also receives a signal from the onboard GPS receiver 160. The detector 162 detects the location of a user. Although the user and the transponder 122 are generally intended to be co-located, i.e., the transponder 122 is within the possession of the user, this may not necessarily be the case. Accordingly, the system 201 determines with precise accuracy where the transponder 22 is located and where the user is located. The detector 162 may utilize infrared, microwave, radar or any other known or future systems for locating objects, or detecting the proximity of one object to another object. If both the user and the transponder 122 are within a predetermined distance from each other, the microcomputer 30 proceeds with the authentication process as previously described hereinbefore. This provides an extra level of security.

The transponder 122 can also be programmed to advise the security device or system of the exact location of the transponder 122 and the distance between the origin of the voice command and the transponder 122. For example, if the security system 201 described above can require that the user must be in the driver's seat to activate those controls that pertain to operating the vehicle, then the commands spoken by the user will be valid only when the user is positioned in the driver's seat. In other words, the system validates that the transponder 122 is located at an exact location within the "driver's space" and then confirms the voice command is "X" distance (in a predefined range) from the transponder 122, calculating that it is also within the driver's space.

Reiterating, the microcomputer 30 may not permit certain actions to be taken depending upon the location of the transponder 122 and the proximity of the user. For example, the microcomputer 30 may refuse to engage the transmission from "park" to "drive" until the transponder 122 and the user are both in the "driver's space". In the same manner, if the vehicle is in motion, the microcomputer will disallow an otherwise authorized voice command to open the doors.

The present invention may take the place of existing remote keyless entry systems whereby a button on a keyfob may be depressed and then the voice command entered into a speaker located on the keyfob. This provides certain functions, such as those performed by the microphone, within the keyfob rather than within the vehicle. In this manner, a user may from a distance, for example in inclement weather, start up the car, turn on the windshield wipers, set the rear defroster on, and set the heat for 80°.

As aforementioned, although the present invention was described with reference to a vehicle, it should be recognized that this is equally applicable to any other individually controllable items. For example, the components shown in FIG. 1 or 4 may not be located and interfaced with a vehicle, but rather they may comprise a security system for a computer. This system, if combined or integrated with any network system or computer using a standardized or uniform interface, can also transmit an encrypted user password (or passwords). Accordingly, this not only identifies the user but by providing the password (or passwords), allows the network or computer system to automatically log in the user (when they arrive) and set the level of access being provided to that particular user. The system also automatically logs out the user when they depart. In this manner, the I/O interface 57 may interface with a computer system either electro-mechanically or via software. The particular levels of security may permit or restrict access to the computer, or even access to certain websites. These security levels and specific actions were implemented and described with reference to Table 1.

If the present invention is utilized with the doors and windows of a residence or a business, the invention may be embodied in a complete "system" whereby all of the security of the windows and doors is centrally located. In contrast, each window and door may include a separate security device as shown in FIGS. 1 and 4. In this manner, each window and door is preprogramable to receive the user's voiceprint templates. Upon initially setting up the security of each individual window and door, a security system may record an individual's voice command, and then replay those voice commands to each individual security device. These voiceprint templates can also be stored in the central files of the security company for even greater identification levels.

Figure 5:
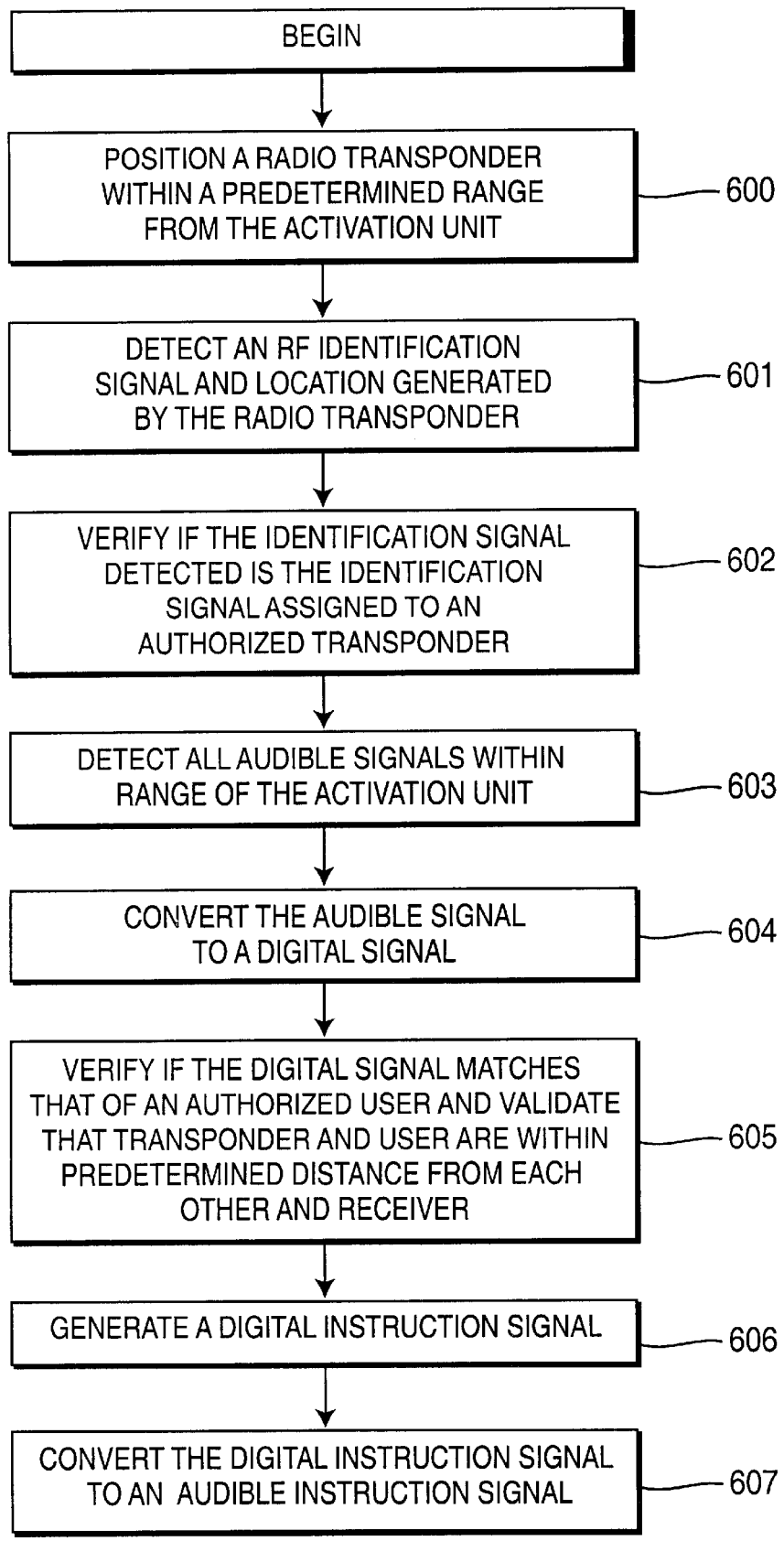
FIG. 5 is a flow diagram which illustrates an alternative method of the present invention.

An alternative method of voice-controlling a security system with a proximity detector and GPS locating is described in FIG. 5. The method includes the steps of: positioning a radio transponder within a predetermined range from the activation unit (step 600); detecting an RF signal generated by the radio transponder including the identification code and location (step 601); verifying if the identification code detected is the identification code assigned to an authorized transponder (step 602); detecting all audible signals within range of the activation unit (step 603); converting the audible signal to a digital signal (step 604); verifying if the digital signal matches that of an authorized user and validating that transponder, and voice are within a predefined distance from each other and the receiver for the requested function (step 605); generating a digital instruction contained within the voice command is being carried out, or whether additional security information or clarification is necessary.

What is claimed is:

1. A vehicle control system for permitting voice control of at least one device in a vehicle by at least one user, the system comprising:

a radio transponder unit which outputs an RF signal which includes an identification code;

an electronic receiver for receiving said RF signal and down converting said received signal to output said identification code;

a microphone for receiving a first audible signal spoken by a first user, said audible signal being specific to said first user and corresponding to at least one function of said at least one device, said microphone converting said first audible signal to a first digital signal;

a memory for storing a plurality of files, each file comprising a voiceprint of a user and a command instruction for controlling said at least one function of said at least one device; and a microprocessor for determining whether said identification code is valid and, if said identification code is valid, for analyzing said first digital signal to determine whether it matches one of said voiceprints stored in memory;

whereby said microprocessor executes said command instruction to control said at least one function of said at least one device if a match has been found.

2. The vehicle control system of claim 1, wherein said microphone is located on said transponder.

3. The vehicle control system of claim 1, wherein said microphone is co-located on an object protected by said security system.

4. The vehicle control system of claim 1, wherein said transponder is contained in a plastic credit card.

5. The vehicle control system of claim 1, wherein said transponder is contained in a keyfob.

6. The vehicle control system of claim 1, whereby said microprocessor only analyzes said digital electronic signal if said identification code is valid.

7. The vehicle control system of claim 1, wherein said transponder is contained within a piece of jewelry.

8. The vehicle control system of claim 7, wherein said jewelry comprises a watch.

9. The vehicle control system of claim 7, wherein said jewelry comprises a wristband.

10. The vehicle control system of claim 1, further comprising:

a second radio transponder unit which outputs a second RF signal which includes a second identification code; whereby the electronic receiver receives said second RF signal and down converts said second received signal to output said second identification code;

the microphone receives a second audible signal spoken by a second user, said second audible signal being specific to said second user and corresponding to at least one function of said at least one device, said microphone converting said second audible signal to a second digital signal;

the microprocessor determines whether said second identification code is valid and, if said identification code is valid, analyzes said second digital signal to determine whether it matches one of said voiceprints stored in memory; and said microprocessor executes said command instruction to control said at least one function of said at least one device if a match has been found.

11. The system of claim 10, whereby said first audible signal is a result of a first command spoken by said first user and said second audible signal is a result of a second command spoken by said second user.

12. The system of claim 11, wherein said first and second commands are the same.

* * * * *